(12) United States Patent
Vangeel et al.

(10) Patent No.: US 10,716,189 B2
(45) Date of Patent: Jul. 14, 2020

(54) CONTROLLER AND METHOD FOR CONTROLLING LUMINAIRES IN A LIGHTING NETWORK

(71) Applicant: SIGNIFY HOLDING B.V., Eindhoven (NL)

(72) Inventors: Jurgen Mario Vangeel, Beerse (BE); Pieter De Vreeze, 'S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/483,795

(22) PCT Filed: Feb. 5, 2018

(86) PCT No.: PCT/EP2018/052744
§ 371 (c)(1),
(2) Date: Aug. 6, 2019

(87) PCT Pub. No.: WO2018/141946
PCT Pub. Date: Aug. 9, 2018

(65) Prior Publication Data
US 2019/0364644 A1 Nov. 28, 2019

(30) Foreign Application Priority Data
Feb. 6, 2017 (EP) .................... 17154860

(51) Int. Cl.
*G05B 11/01* (2006.01)
*H05B 47/105* (2020.01)
(Continued)

(52) U.S. Cl.
CPC .......... *H05B 47/105* (2020.01); *H05B 47/16* (2020.01); *H05B 47/19* (2020.01); *G05B 19/10* (2013.01)

(58) Field of Classification Search
CPC  H05B 37/0272; H05B 37/0281; G05B 10/10; G05B 19/10
(Continued)

(56) References Cited

U.S. PATENT DOCUMENTS

2010/0123570 A1  5/2010  Antonopoulos et al.
2014/0097759 A1  4/2014  Verfuerth et al.
(Continued)

FOREIGN PATENT DOCUMENTS

EP  2595465 A2  5/2013
WO  2015150945 A1  10/2015

*Primary Examiner* — Thuy V Tran
(74) *Attorney, Agent, or Firm* — Meenakshy Chakravorty

(57) ABSTRACT

Luminaire controllers and methods for controlling luminaires are disclosed. A luminaire controller comprises a sensor input, a communication interface, a mode selector, a local control component, and a distributed control component. The sensor input receives sensor signals from occupancy sensing devices of a luminaire, the communication interface communicates with a lighting network, the mode selector selects an operating mode for the luminaire based on sensor signals and occupancy information, the local control component controls an illumination source of the luminaire according to a selected operating mode, and the distributed control component selectively broadcasts occupancy messages by initiating a distributed control procedure.

15 Claims, 9 Drawing Sheets

(51) Int. Cl.
*H05B 47/16* (2020.01)
*H05B 47/19* (2020.01)
*G05B 19/10* (2006.01)

(58) Field of Classification Search
USPC .............................................. 700/14, 75, 79
See application file for complete search history.

(56) References Cited

U.S. PATENT DOCUMENTS

| | | | |
|---|---|---|---|
| 2015/0015145 A1* | 1/2015 | Carrigan ............ | H05B 37/0272 315/131 |
| 2015/0048758 A1* | 2/2015 | Carrigan ............ | H05B 33/0842 315/294 |
| 2015/0351169 A1* | 12/2015 | Pope .................... | H05B 33/086 315/193 |
| 2016/0157325 A1 | 6/2016 | Cregg et al. | |
| 2017/0347433 A1* | 11/2017 | Sierla ................ | H05B 37/0245 |

\* cited by examiner

CONTROLLER AND METHOD FOR CONTROLLING LUMINAIRES IN A LIGHTING NETWORK

CROSS-REFERENCE TO PRIOR APPLICATIONS

This application is the U.S. National Phase application under 35 U.S.C. § 371 of International Application No. PCT/EP2018/052744, filed on Feb. 5, 2018, which claims the benefit of European Patent Application No. 17154860.5, filed on Feb. 6, 2017. These applications are hereby incorporated by reference herein.

TECHNICAL FIELD

The present invention relates to distributed control of a lighting network, i.e. where luminaires in the lighting cooperate to control one another without any need for a central controller.

BACKGROUND

"Connected lighting" refers to a class of lighting system in which the lights (luminaires) can be controlled based on the communication of data between the lights and a controlling device (such as a smartphone, tablet, smart-switch etc.) using network technology, according a network communications protocol or combination of such protocols, such as Zig-Bee, Bluetooth, Wi-Fi, Ethernet etc. In this manner, the luminaires form a lighting network, where the luminaires are nodes of the lighting network. This allows a connected lighting system to provide richer functionality than traditional lighting systems, for example allowing a user to directly control the lights using an application (app) executed on a smartphone, wearable device or other user device, and to easily incorporate new control points, such as light switches or sensors, into the lighting network without the rewiring that would be needed in a legacy system.

An "intelligent luminaire" as the term is used herein refers to a luminaire for use in a lighting network, which comprises a lighting unit (i.e. illumination source); one or more sensors for detecting occupancy; control logic, such as a microcontroller configured to intelligent behavior; and a communication interface i.e. some communications means to communicate with other devices in the lighting network—either directly, or via one or more other luminaires in the lighting network—to allow messages to be received from the lighting network and sensor data to be communicated to other devices in the network.

The luminaires can be configured to act as routers, such that as well as providing illumination, they also route messages between other devices in the lighting network. In the context of a ZigBee network, such devices are referred to as ZigBee Routers (ZR).

A lighting network may be controller by a central controller. In a ZigBee network, the device designated as the ZigBee Coordinator (ZC) acts as a centralized area controller, which can for example also function as a gateway (bridge) to other networks. With this architecture, although commands can be relayed from one luminaire to another, the commands originate from the central controller.

D1 (EP 2 595 456 A2) discloses transmitter, receiver and a wireless lighting system, wherein the transmitter receives an activation signal from a sensor and transmit a wireless signal comprising the transmitter ID and data indicating a length of time T for which a receipt light should turn on or off. The receiver comprises an output to sending a control signal to a light, a timer and a radio receiver.

SUMMARY

Whilst centralized control can simplify the lighting network, it also introduces a single point of failure: if the area controller fails, the luminaires in the lighting network can no longer be controlled until the failure is corrected or a new area controller is assigned. For this reason, one can opt to have the luminaires operate with distributed control (i.e. without a central area controller) to remove this single point of failure.

As these luminaires become more and more complex, the control logic (hardware and software) needed to control these luminaires also becomes increasingly complex. As the control logic becomes more complex, the required communication also becomes more complex. Unless properly managed, there is a strong risk that the network will no longer be able to handle the increased communication requirements imposed by distributed control, particularly in a large network and limited bandwidth (e.g. ZigBee).

The inventors of the present invention have recognized a particular problem with distributed control based on occupancy monitoring (i.e. where the illumination sources of the luminaires are switched-on automatically when occupancy is detected, and switched-off automatically when no occupancy has been detected recently), namely that when an occupancy-related event occurs that necessitates coordination between the luminaires, multiple luminaires may respond to this event by broadcasting occupancy messages, causing "flooding" of the network where there is insufficient network bandwidth to handle this. In ZigBee in particular, broadcasting messages is expensive, as all nodes that receive a broadcast message have to rebroadcast it (at least once) so flooding can easily occur.

Accordingly, a first aspect of the present invention is directed to a luminaire controller for a luminaire comprising: a sensor input configured to receive sensor signals from at least one occupancy sensing device of the luminaire; a communication interface for communicating with a lighting network; a mode selector configured to select one of a set of operating modes for the luminaire based on a combination of the sensor signals and incoming occupancy messages received from the lighting network; a local control component configured to control an illumination source of the luminaire according to the selected operating mode; and a distributed control component configured to selectively broadcast outgoing occupancy messages via the lighting network when a first of the operating modes is selected by initiating a distributed control procedure when an initiation event occurs.

The distributed control procedure, once initiated, is performed as follows: if a randomized wait interval elapses relative to a timing of the initiation of the distributed control procedure without an incoming occupancy message being received from the lighting network, responding by broadcasting an outgoing occupancy message via the lighting network, wherein no outgoing occupancy message is broadcast if an incoming occupancy message is received before that interval elapses. That is, if the incoming occupancy message is received from the lighting network before that interval elapses, then no broadcast occurs from the luminaire; otherwise the outgoing occupancy message is broadcast.

A second aspect of the present invention is directed to a luminaire comprising a luminaire controller according to the first aspect, and at least one occupancy sensing device and an illumination source coupled thereto.

In a lighting network with multiple luminaires configured in this manner, the randomization of the wait time interval ensures that only one of the luminaires in the first operating state will respond to the initiation event by broadcast an outgoing occupancy message (i.e. the luminaire whose wait interval elapses first), which not only allows that luminaire to communicate any required information to other luminaires in the outgoing message, but also suppresses the transmission of outgoing occupancy messages (such as duplicate or inappropriate messages) from other luminaires. An example of an inappropriate message is where occupancy notifications are periodically broadcast whilst ongoing occupancy is detected; in some implementations, these occupancy notifications prevent an optional switch-off instruction from being broadcast, which would be inappropriate if at least one luminaire is still detecting occupancy (see below).

In embodiments the initiation event may be: the selection of the first operating mode by the mode selector, or the receipt of an incoming occupancy message from the lighting network at a time when the first operating mode is selected.

The set of operating modes may comprise:

a task mode, which the mode selector is configured to select in response to detecting an indication of occupancy in the sensor signals, an unoccupied mode, a background mode, wherein the mode selector is configured to switch from the unoccupied mode to the background mode in response to an incoming occupancy message.

The local control component may be configured to control the illumination source to emit light at a greater intensity when the background or task mode is selected than when the unoccupied mode is selected. For example, the local control component may be configured to control the illumination source to emit light at a greater intensity when the background mode is selected than when the unoccupied mode is selected, and at an even greater intensity when the task mode is selected.

The mode selector may be configured to switch from the task mode to the background mode when no indication of occupancy has been detected in the sensor signals for a hold interval.

The distributed control procedure may be a notification procedure performed repeatedly whilst the first operating mode remains selected, as follows:

any time a randomized notification wait interval elapses relative to the timing of the initiation of the notification procedure without an incoming occupancy notification being received from the lighting network, responding by broadcasting an outgoing occupancy notification via the lighting network and re-initiating the notification procedure, any time an incoming occupancy notification is received before the randomized notification wait interval elapses relative to the timing of the initiation, responding by re-initiating the notification procedure without broadcasting an outgoing occupancy notification, wherein the notification procedure is terminated when a switch from the first operating mode to a different one of the operating modes occurs.

The first operating mode may be the task mode, whereby the notification procedure is performed repeatedly whilst the task mode remains selected.

The notification procedure may be initiated in response to the change from the second operating mode to the first operating mode.

The distributed control component may also be configured to broadcast an initial occupancy message via the lighting network in immediate response to the change from the second operating mode to the first operating mode, unless a recent incoming occupancy notification has been received at that luminaire when that change occurs (recent in that the time between the incoming occupancy notification (if any) the subsequent change is less than a predetermined time interval).

The distributed control component may be configured to broadcast a final occupancy message upon termination of the notification procedure. Alternatively, this may be omitted to further reduce broadcast traffic, as explained below with reference to FIG. 5D.

The notification procedure may be terminated in response to a switch from the task mode to the background mode.

The mode selector may be configured to switch from the background mode to the unoccupied mode when no occupancy notification has been received for a switch-off wait interval or in response to an incoming switch-off instruction from the lighting network.

The switch-off wait interval may be randomized, wherein the distributed control component is configured to broadcast via the lighting network an outgoing switch-off instruction when the randomized switch-off wait interval elapses, unless an incoming switch-off instruction is received before that interval elapses.

The switch-off wait interval may be longer than the notification wait interval.

As another example, the distributed control procedure may be an instructing procedure performed repeatedly whilst the first operating mode remains selected as follows:

if a randomized instructing wait interval elapses relative to the timing of the initiation of the instructing procedure without an incoming occupancy notification being received from the lighting network, responding by broadcasting an outgoing instruction via the lighting network, wherein the local control component is configured to adjust an intensity of light emitted by the illumination source in that event;

any time an incoming occupancy notification is received before the randomized instructing wait interval elapses relative to the timing of the initiation, responding by re-initiating the instructing procedure without broadcasting an outgoing instruction, wherein the local control component does not adjust the light intensity in that event, whereby the intensity is adjusted only when incoming occupancy notifications have ceased.

If the randomized instructing wait interval elapses relative to the timing of the initiation of the instructing procedure without an incoming occupancy notification being received from the lighting network, the mode selector may respond by switching to a different one of the operating modes and the instructing procedure is terminated.

The first operating mode may be the background mode.

The different operating mode may be the unoccupied mode, and the instruction may be a switch-off instruction (causing other luminaires to transition to the unoccupied as well).

The distributed control component may be configured to perform the notification procedure in the task mode and the instructing procedure in the background mode.

A new randomized wait interval may be used each time the distributed control procedure is re-initiated.

The randomized wait interval may be computed by adjusting a predetermined wait interval with a randomly generated jitter time.

A second aspect of the present invention is directed to a method of controlling a plurality of luminaires in a lighting network, the method comprising implementing, at each of the luminaires, the following steps: receiving sensor signals from at least one occupancy sensing device of the luminaire; selecting one of a set of operating modes for the luminaire based on a combination of the sensor signals and incoming occupancy messages received at the luminaire from the lighting network; controlling an illumination source of the luminaire according to the selected operating mode; and selectively broadcast outgoing occupancy messages via the lighting network when a first of the operating modes is selected by initiating a distributed control procedure when an initiation event occurs, the distributed control procedure, once initiated, being performed as follows: if a randomized wait interval elapses relative to a timing of the initiation of the distributed control procedure without an incoming occupancy message being received from the lighting network, responding by broadcasting an outgoing occupancy message via the lighting network, wherein no outgoing occupancy message is broadcast if an incoming occupancy message is received before that interval elapses.

In embodiments, any feature of any embodiment of the first aspect may be implemented.

A third aspect of the present invention is directed to a computer program product comprising code stored on a computer readable storage medium and configured, when executed at a luminaire, to implement the steps of the method of the second aspect or any embodiment thereof.

BRIEF DESCRIPTION OF FIGURES

For a better understanding of the present invention, and to show how embodiments of the same may be carried into effect, reference is made to the following figures in which.

DETAILED DESCRIPTION OF EXAMPLE EMBODIMENTS

In a lighting network operating with distributed control based on occupancy monitoring, ideally one would like that all light control and occupancy messages are shared with all devices in the area. Embodiments of the invention are describe in the context of a ZigBee network, where these messages are:

Broadcast light control messages ("instructions"), instruction other luminaire(s) to go to a certain dimming (dim) level, go to a certain preset etc.

Broadcast motion synchronization (sync) messages ("occupancy notifications") by all nodes that detect occupancy, to make sure luminaires that do not detect occupancy themselves remain active (e.g. to provide background illumination).

As noted, particularly in ZigBee, broadcast messages are very expensive, as all nodes that receive a broadcast message have to rebroadcast it (at least once). This leads to the system requirement to limit the number of ZigBee broadcasts to about one message per second maximum. Particularly in large network, e.g. a network of several hundred ZigBee nodes, without any additional measures, there is a high risk of exceeding this limit, causing network flooding.

The described embodiments allow the number of broadcast messages in the ZigBee network to be reduced, while still maintaining a robust, fool-proof method of performing distributed light control and sharing occupancy information.

Figure 1:
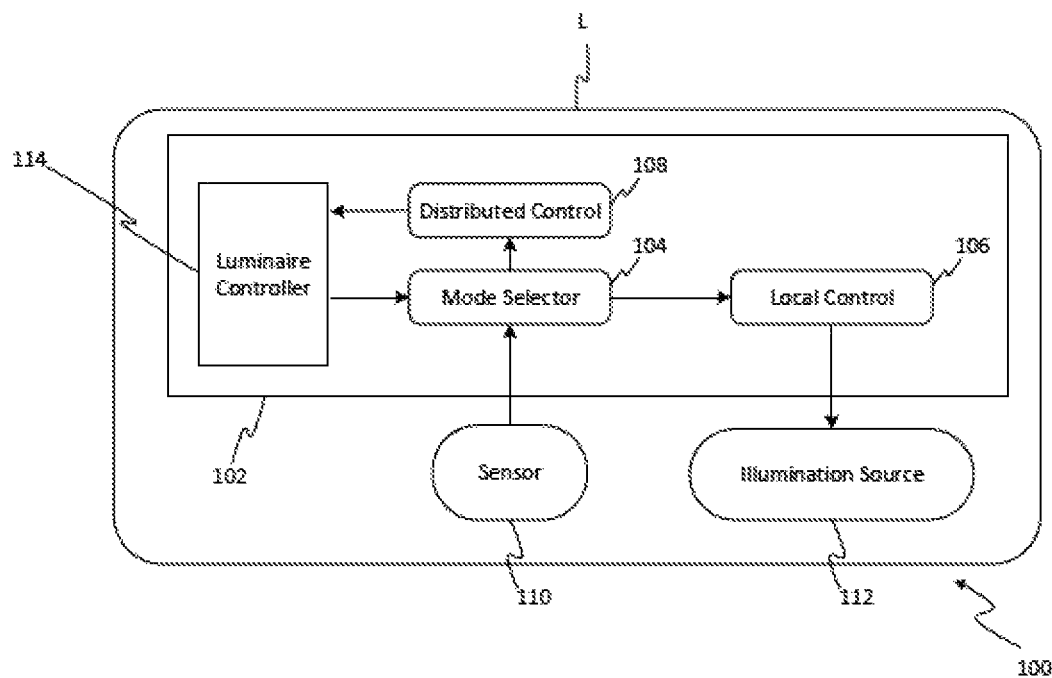
FIG. 1 shows a functional block diagram of a luminaire in a lighting network.

FIG. 1 shows a functional block diagram of a luminaire L, i.e. illumination device, in a lighting network 100. The luminaire comprises a luminaire controller 102, and at least one occupancy sensing device 110 (occupancy sensor) and an illumination source 112 connected to the luminaire controller 102.

The occupancy sensor 110 can be any device suitable for detecting occupancy, i.e. for detecting indications that a user may be present in an area sensed by the occupancy sensor 110, such as motion sensors, e.g. passive-infrared (PIR) sensors, cameras etc.

The illumination source 112 can be any device or devices capable of emitting illumination, i.e. light of sufficient intensity and over a sufficient area that a user in the vicinity of the luminaire L can see his surroundings as a consequence, such as LED lamps, gas-discharge or filament bulbs etc.

The luminaire L can take any suitable form such as a ceiling or wall mounted luminaire, a free standing luminaire (e.g. table lamp, desk lamp or floor lamp etc.), a wall washer, or a less conventional form such as an LED strip, a luminaire built into a surface or an item of furniture, or any other type of illumination device for emitting illumination into a space so as to illuminate the space.

The luminaire controller 114 comprises a communication interface 114, via which messages can be transmitted and received to other luminaires in the lighting network 100, with directly or indirectly via one or more other luminaires in the lighting network 100. The messages are preferably wireless messages transmitted and received as wireless, e.g. radio-frequency (RF) signals.

Various functional component of the luminaire controller 102 are shown, namely a mode selector 102, a local control component 108 and a distributed control component 108. These represent respective control functions that are implemented by the luminaire controller 114. Preferably the luminaire controller 114 comprises a processor (e.g. a CPU or CPUs) and a memory, where these functions are implemented by executable instructions, held in the memory, when fetched from the memory and executed by the processor. These instruction can for example be embedded software (firmware), higher-level software or a combination thereof etc. That is, the components 102-108 may be software components executed on the processor to implement the respective control functions. The processor and memory can for example be embodied in a microcontroller of the luminaire controller 102.

The local control component 106 control the luminaire's own illumination source 112, and the distributed control component controls other luminaires by sending messages via the lighting network 100. Both operate according to an operating mode selected by the mode selector 104, which corresponds to a current state of the luminaire L. In the described examples, the mode selector 104 implements a state machine to select between different operating modes, corresponding to different states, as described later with reference to FIGS. 3A and 3B.

The mode selector 104 is shown to have a first input connected to receive incoming messages from the communication interface 114, a second input connected to receive sensor signals from the occupancy sensor 110, a first output connected to an input of the local control component 106, and a second output connected to an input of the distributed control component 108. The local and distributed control components 106, 109 are also shown to have outputs connected to the illumination source 112 and communication interface 114 and respectively, for controlling the illumination source 112 and transmitting outgoing messages respectively. Note that these various inputs and outputs denote high-level interaction between the various components of the luminaire L and do not necessarily correspond to any particular arrangement of physical or logical connections.

Although these details are only shown for one luminaire only in FIG. 1, it will be appreciated that multiple luminaires in the lighting network 100 can be configured in this manner, so that messages can be transmitted and received between luminaires via the lighting network 100.

Figure 2:
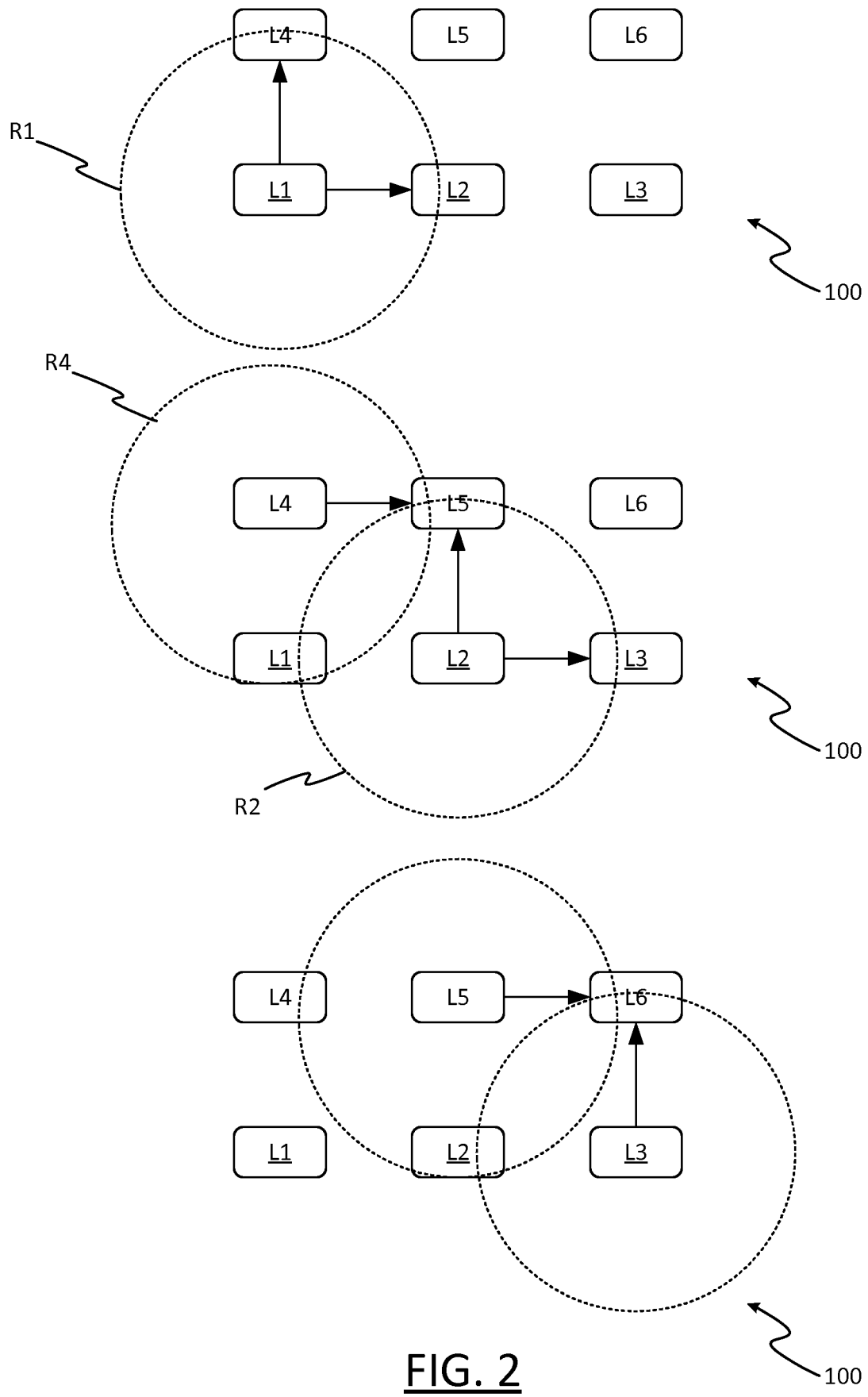
FIG. 2 illustrates an example mechanism for broadcasting messages in a lighting network.

By way of example, FIG. 2 shows an example plan view of the lighting network 100 comprising six luminaires—L1 to L6—each having the configuration of the luminaire L in FIG. 1. The luminaires are arranged in two parallel rows of three luminaires.

However, it will be appreciated that this is just an example, and the lighting network can comprise fewer or more luminaires—even several hundred luminaires or more in large networks—in any suitable physical arrangement.

FIG. 2 shows L1 broadcasting a message, which is received by all of the luminaires within a direct communication range R1 of L1-L2 and L4 in this example. The message contains a message identifier (ID) such as a source address of L1 and a sequence number (or sequence numbers if the message is transmitted as multiple packets); a bespoke message ID in header data of the message etc.—which allows the message to be distinguished from any other messages transmitted at similar times. The message may also comprise an indication that is it a broadcast message, intended to be transmitted to all luminaires in the network 100, as opposed to a message intended for a specific luminaire only. From the message ID, L2 and L4 can determine that they have not received this broadcast message before, and therefore re-broadcast the message for receiving by any luminaires within their respective direct communication ranges R2, R4-L1, L3, L5 and L1, L5 respectively in this example. This in turn causes L3 and L5 to re-broadcast the message; L1 does not broadcast the message even if it receives it, as it can tell from the message ID that it has already done so. L5 may receive two copies of the message, but can recognize them as duplicates from the message ID. Finally, L6 receives the message (from L3 and L5 in this example), meaning that all luminaires in the network 100 have now received it. L6 has no way of knowing this, so will at this point also rebroadcast the message but no further re-broadcasts will occur as any luminaire that receives it will see from the message ID that it has already done so.

Any one of the luminaires in the network 100 can broadcast an outgoing message for receiving by the other luminaires in the network 100 in this manner, which provides a basis for the distributed control mechanisms described herein.

The distributed control is based on the broadcasting of what are referred to herein as "occupancy messages". By way of example, an occupancy message can comprise a instructions to cause other luminaires to adjust their light (i.e. illumination) level, i.e. (luminous) intensity, under certain circumstances (e.g. switch-on when occupancy is detected, or switch-off when no occupancy is detected), and/or an occupancy notification to prevent other luminaires from adjusting their light level.

For instance, in the described examples, an occupancy notification is transmitted by a luminaire that is detecting occupancy, to prevent other luminaires in the same area that are not detecting occupancy from switching off, to maintain background illumination from those luminaires that are not detecting occupancy. That is, luminaires that are currently detecting occupancy, via their own occupancy sensors 110, are not the only luminaires to provide illumination other luminaires in the lighting network are also activated to provide illumination (at the same or at a lower intensity, depending on the implementation).

Herein, a luminaire is said to be "detecting occupancy" when it is currently sensing motion (or some other indication of occupancy in the sensor signals) via its occupancy sensor 110 or when it is not currently sensing motion (or some other indication of occupancy in the sensor signals) but has done so less that a certain amount of time ago—referred to as the hold time/hold interval $t_{hold}$. Upon expiry of the hold interval $t_{hold}$ relative to a timing of the most recent indication of occupancy, the luminaire is said to be no longer detecting occupancy or, equivalently, to be "detecting vacancy".

Within the lighting network 100, the luminaires can be sub-divided into areas. For example, each luminaire may be associated with one of a plurality of area IDs (which can be chosen to match the physical areas in which they are located if desired). A message to be broadcast to luminaires in a given area (or areas) only can include the ID for that area(s), where any luminaires outside of that area(s) ignore the message, i.e. do not act up it. Depending on the configuration, luminaires receiving a message from outside of their area may or may not re-broadcast it (e.g. a luminaire in one area may still be used to route messages between luminaires in another area, even if it does not act upon those messages itself). In this case, luminaires will generally only respond to occupancy notification and instructions from luminaires in the same area (and may or may not they re-broadcast them).

Thus it will be appreciated that the techniques described herein can be applied to all luminaires in a lighting network, or only a subset of the luminaires.

Figure 3A:
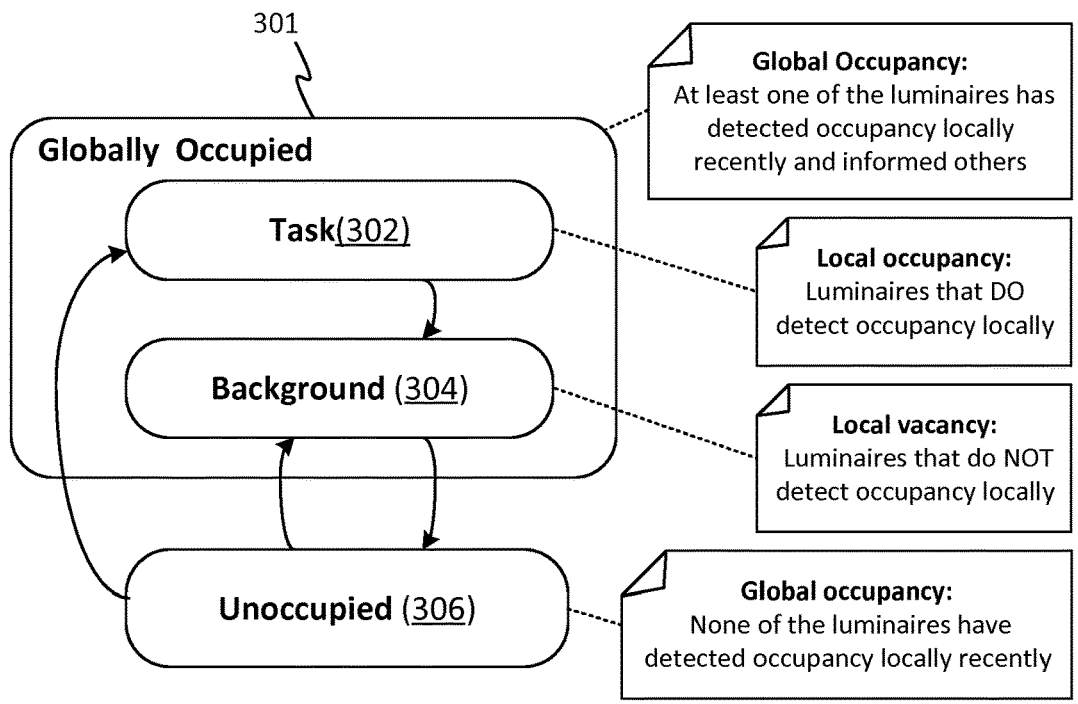
FIG. 3A shows a state diagram for a luminaire.
Figure 3B:
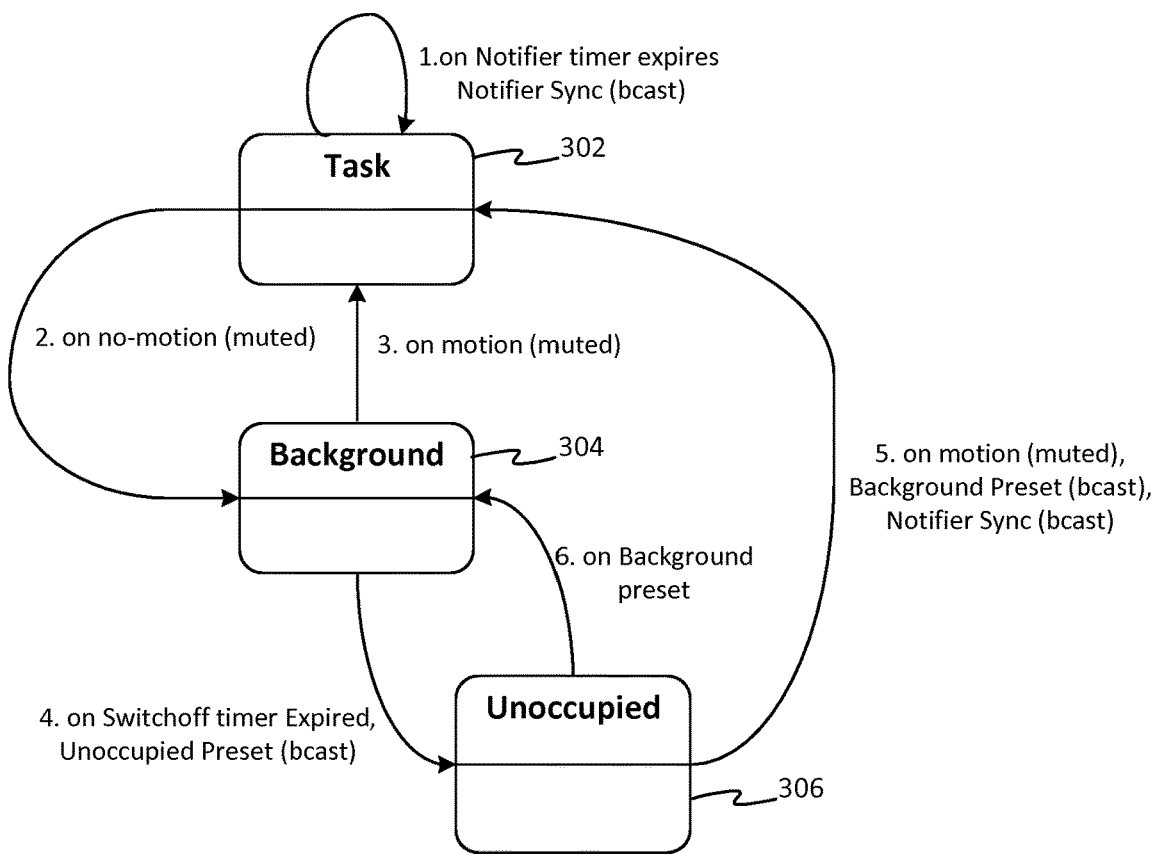
FIG. 3B shows further details of the state diagram.

With reference to FIGS. 3A and 3B, which show state diagrams for the luminaire L, the lighting network 100 is configured in such a way that when no luminaires are detecting occupancy all luminaires (in the same area) are in an Unoccupied state 302. When one or more luminaires detect occupancy, all luminaires switch to a (globally) Occupied state 301, where the devices that are detecting occupancy go a Task (sub)state 302 and all other devices go a Background (sub)state 304, where each state has a corresponding light level. For example:

a highest light level (task level) for the Task state 302 (e.g. maximum level), a lowest level for the Unoccupied state 306; this can be a zero-level (i.e. substantially zero luminous intensity) with the illumination source 112 switched off, or a low level e.g. to provide emergency lighting;

an intermediate light level (background level) in between the highest and lowest for the Background state 304; alternatively, the same light level could be used for the Task and Background states 302, 304 in some contexts.

The operation of the luminaire L changes depending on which of the Task, Background and Unoccupied states 302, 304, 306 the luminaire L is currently in. Hence these states constitute different operating modes of the luminaire L. As noted, switches between these different operating modes are managed locally at the luminaire L by the mode selector 104 in the manner described below.

The Unoccupied state 306 is a state of global occupancy, only selected when none of the luminaires have detected occupancy locally recently—that is, when there is global vacancy. As a general rule, either all of the luminaires or none of the luminaires (at least in a given area) should be in this state at any one time.

A luminaire will transition from the Unoccupied state 306 to the Task state 302 upon detecting occupancy with its local occupancy sensor 110—that is, when there is local occupancy; and from the Unoccupied state 306 to the Background state 302 upon receiving an occupancy notification form another luminaire (without detecting occupancy locally itself)—that is when there is global occupancy, but local vacancy at that luminaire.

In the Background state 304 a Switchoff timer is rendered active, which upon expiration causes the luminaire to instruct all other luminaires to switch "off"; that is, cause them to transition to the Unoccupied state 306, and also revert to the Unoccupied state 306 itself. Measures are taken to ensure that only a single device does so (see below). Whilst preferred, the switch-off instruction can be omitted—see below.

In this manner, each luminaire in the Background state 304 performs an instructing procedure, which is a switch-off procedure that will eventually cause all of the luminaires to revert to the Unoccupied state 306 when occupancy is no longer detected at any of the luminaires.

A luminaire in the Background state 304 will transition to the Task state 302 upon detection local occupancy with its local occupancy sensor 110.

In the Task state 302 a Notifier timer is rendered active, which upon expiration causes the device to notify all other devices that there still is occupancy (by broadcasting an occupancy notification), and all devices will reset their timers (Notifier and Switchoff timers). Again, measures are taken to ensure that only a single device does so (see below).

Herein, a timer is said to be rendered active in that, if and when the active timer expires, that expiration is acted on, by the luminaire transmitting an occupancy message in response (an occupancy notification in the Task state 302 and a switch-off instruction in the Background state 304). It could be rendered active by starting it on entry to the applicable state (Background state 304 for Switchoff timer; Task state 302 for Notifier timer), or it may already be running before then, whilst inactive, but not acted upon For example, the Notifier timer may be used as a global timer on each device, including those in the Background state (but only devices in the Task state 302 will send an occupancy notification when this time expires). An example of this is described below, with reference to FIGS. 6A and 6B.

A luminaire will transition from the Task state 302 to the Background state 302 when it is no longer detecting occupancy locally that is, when the hold time $t_{hold}$ expires relative to the most recent detected indication of occupancy (e.g. the most recently detected motion).

The lighting system 100 is configured such that the first device that detects occupancy in the area notifies all others of occupancy by means of a broadcast message. This will guarantee that all lights in the area are (at least) at background level. A Notifier timer will be rendered active on the devices that detect occupancy to repeat notifications to other devices in the area, such that they will remain (at least) in background level.

In this manner, each luminaire in the Task state 302 performs a notification procedure to notify other luminaires that they are still detecting occupancy.

The switch-off and notification procedures are examples of distributed control procedures, as the latter term is used herein.

To guarantee that only one device in the area will send such a notification or instruction, a jitter time ($t_j$) is added to the default timer values making the notification time and switch off time unique in the whole network. That is, for the Notifier and Switchoff timers, predetermined a notification wait interval $t_{notify}$ and a (longer) predetermined switch off interval $t_{off}$ are adjusted by the random jitter $t_j$. For example, five minutes or so may be appropriate in some contexts for the notification wait interval, with a somewhat longer switch-off wait interval.

The jitter time is chosen such that each node has at least enough time to broadcast a message across the entire network The calculation of the jitter can be performed using a random generator, defined by per the following pseudo-code:

$$\text{jitter} = \text{rand}(\min, \max) * t$$

Where;
min=0
max=Expected number of devices in the network
t=Network transmission time of a broadcast message That is, by randomly selecting a jitter time from a range of values (including zero) chosen according to an expected number of luminaires in the network 100 and an expected network transmission time of a broadcast message.

This is just an example, and a predetermined interval can be offset by a jitter in other ways. For example, one can jitter "around" the interval by $$\pm \frac{t_j}{2}.$$

The jitter is calculated by each device every time it resets its timers.

Upon receiving this notification message, the Notifier timer will be reset on the devices in state Task (devices that detect occupancy) and on all other devices the Switchoff timer will be reset (for devices that are in state Background), to prevent them from switching off the entire area. That is, upon receiving an occupancy notification all devices will reset their timers. Where the Notifier timer is used as a global timer, all devices in the lighting network will reset the Notifier timer upon receiving the notification message.

Other devices that detect occupancy while already notified, will not notify other nodes (reducing broadcast messages). That is to say, a luminaire in the Background state 304 that transitions to the Task state 302 will only transmit an occupancy notification at that point if it has not received an occupancy notification sufficiently recently: in this example, if more than $t_{notify}$ has elapsed (e.g. more than five minutes) since the last incoming occupancy notification, then a further occupancy notification is needed at this point, as otherwise there is a risk some luminaires could switch off; otherwise none is needed, as the recent occupancy notification will have prevented the other luminaires from switching off—see below for examples that illustrate this.

When a device does not detect occupancy locally (i.e. when it is in the Background state 304 or the Unoccupied state 306), it will not send out notifications. When no device in the network 100 detects occupancy and there are one or more devices in the Background state 304, one of those device(s) will have its Switchoff timer expire first (the one with the shortest jitter time), and this device will then proceed to switch off the entire area (e.g. go to dim level, go to preset, . . . ) using a broadcast message with a suitable instruction.

Typically this will lead to the following number of broadcasts:

1 broadcast upon a user entering an area to switch on the lights 1 broadcast, say every five minutes as long as occupancy is detected.

1 broadcast upon the user leaving the area to switch off the lights

This scheme has various advantages: it provides fully distributed control, all the luminaires can operate with an identical configuration, whilst reducing network traffic such that peak (broadcast) loads are prevented.

Figure 4:
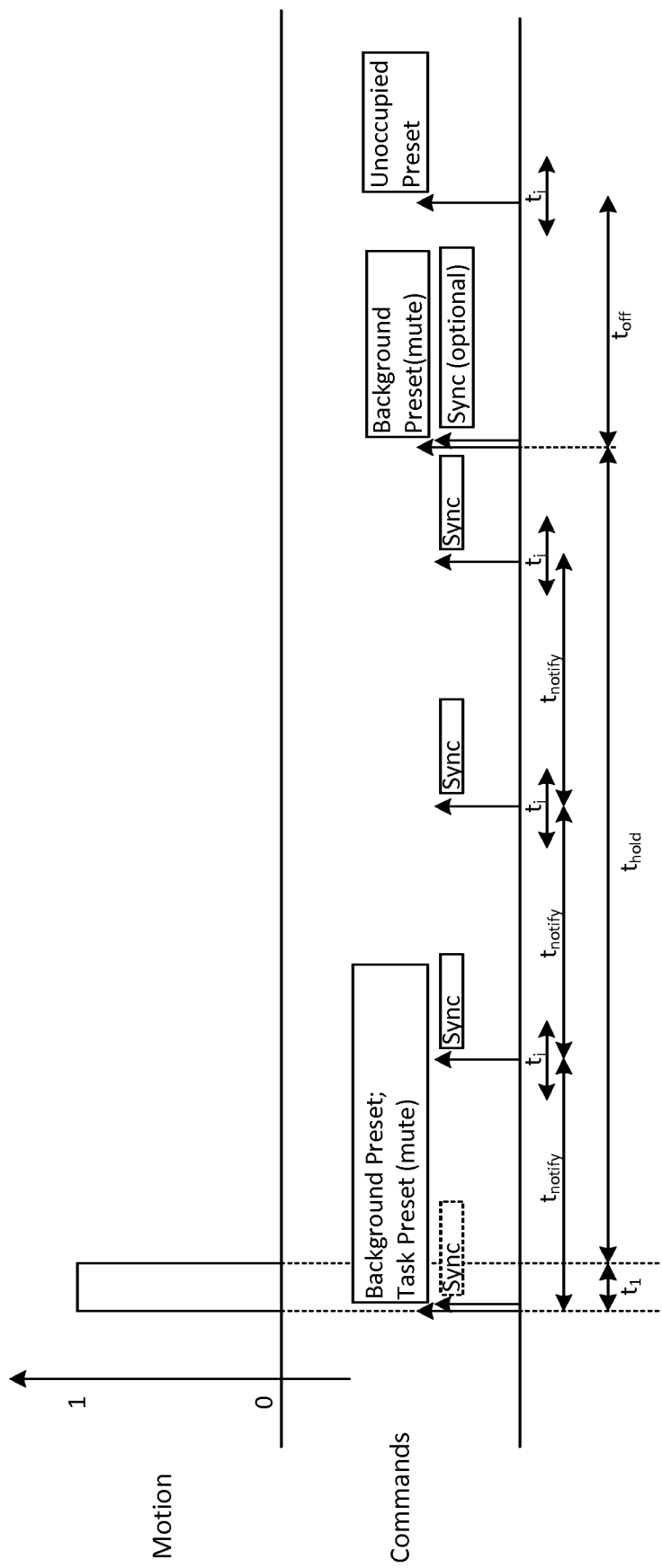
FIG. 4 illustrates how an example reaction of a luminaire to detected motion.

To further aid illustration, FIG. 4 illustrates possible behavior of a luminaire following this scheme, demonstrating different pre-set commands and timers that are in play.

Upon detection of motion (in this case a limited motion, persisting for a duration $t_1$) the luminaire L that detects motion will instruct the other devices in the network 100 to go to background level (Background Preset), and will go to task level itself (Task Preset mute, where the "mute" terminology means this change to state Task will not, as such, be broadcasted on the network 100). Depending on the circumstances, an occupancy notification may be sent such that all Notify and Switchoff timers are synced at other luminaires. That is, an occupancy notification is selectively broadcast at this point (see below).

Depending on the configured jitter $t_j$, the node that detects occupancy and has it Notifier timer expire first (because of lowest jitter) will be the first and only device to send out a sync message. Other nodes detecting occupancy will immediately reset their timers and therefore not send out this sync message.

Upon expiration of the hold time $t_{hold}$, the device will stop sending out sync messages and will move to state Background (background level—mute) and a last sync message will be sent.

Upon expiration of the Switchoff timer, the area will be switched off by a device sending out an off (Unoccupied Preset) command.

To illustrate how this can work in a practical context, further examples will now be described with reference to FIGS. 5A-C.

Figure 5A:
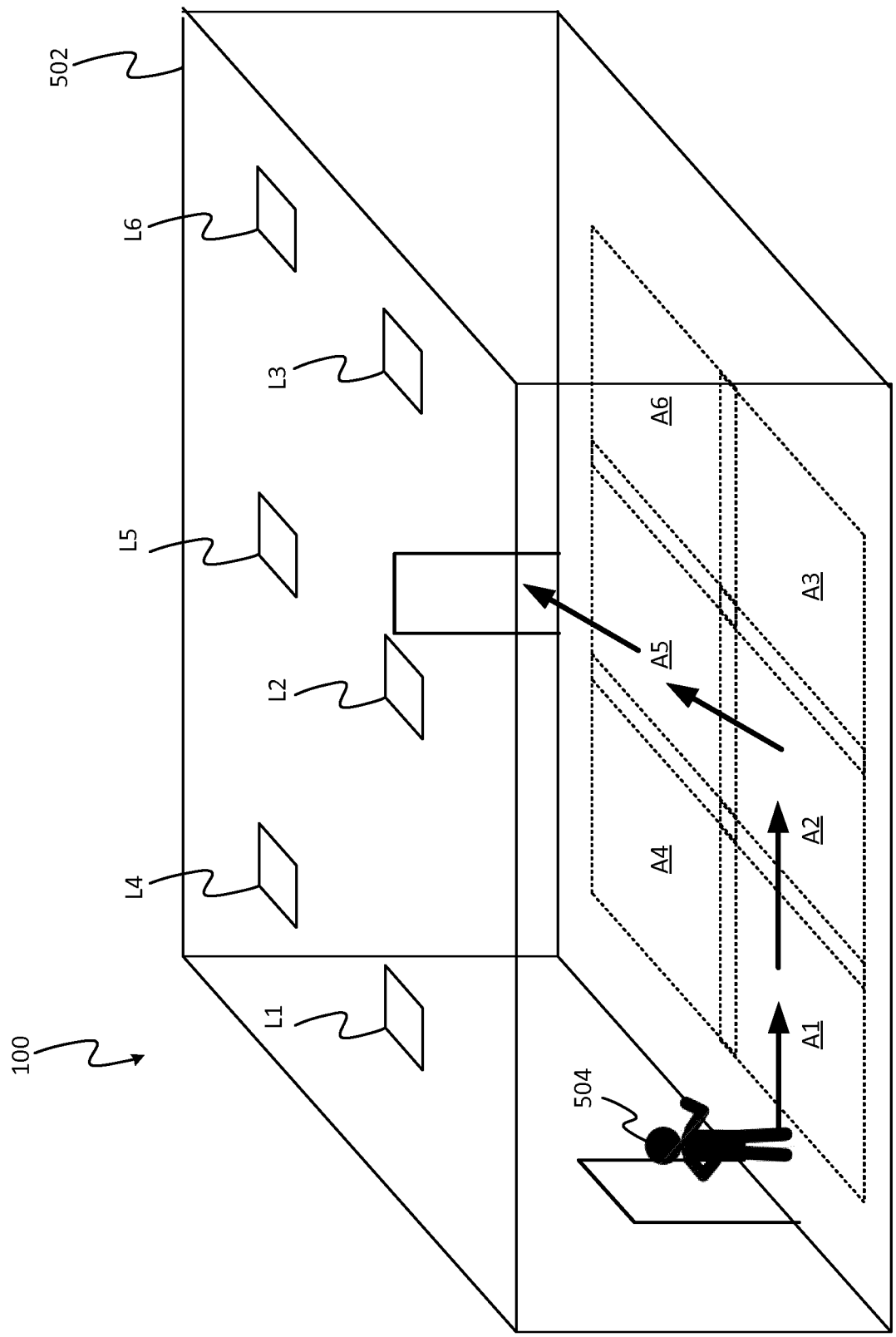
FIG. 5A shows a perspective view of a space illuminated by a set of luminaires.

FIG. 5A shows a space 502, which a room with the luminaires L1-L6 (of FIG. 2) arranged on the ceiling to illuminate the room below. Each luminaire L1-L6 has a respective sensing area (A1-A6 respectively), such that when a user 504 enters that area they are sensed by the occupancy sensor 110 of that luminaire. In the following examples, the occupancy sensor 110 is a motion sensor which can sense motion within that sensing area, but as noted the present techniques apply to other forms of occupancy sensor. FIG. 5A shows an example path traversed by the user 504 upon entering the room, through sensing areas A1, A2 and A5 in turn—remaining in each for a few minutes before leaving the room. As such, luminaires L1, L2 and L5 locally detect occupancy one-by-one, whereas luminaires L3, L4 and L6 do not.

Figure 5B:
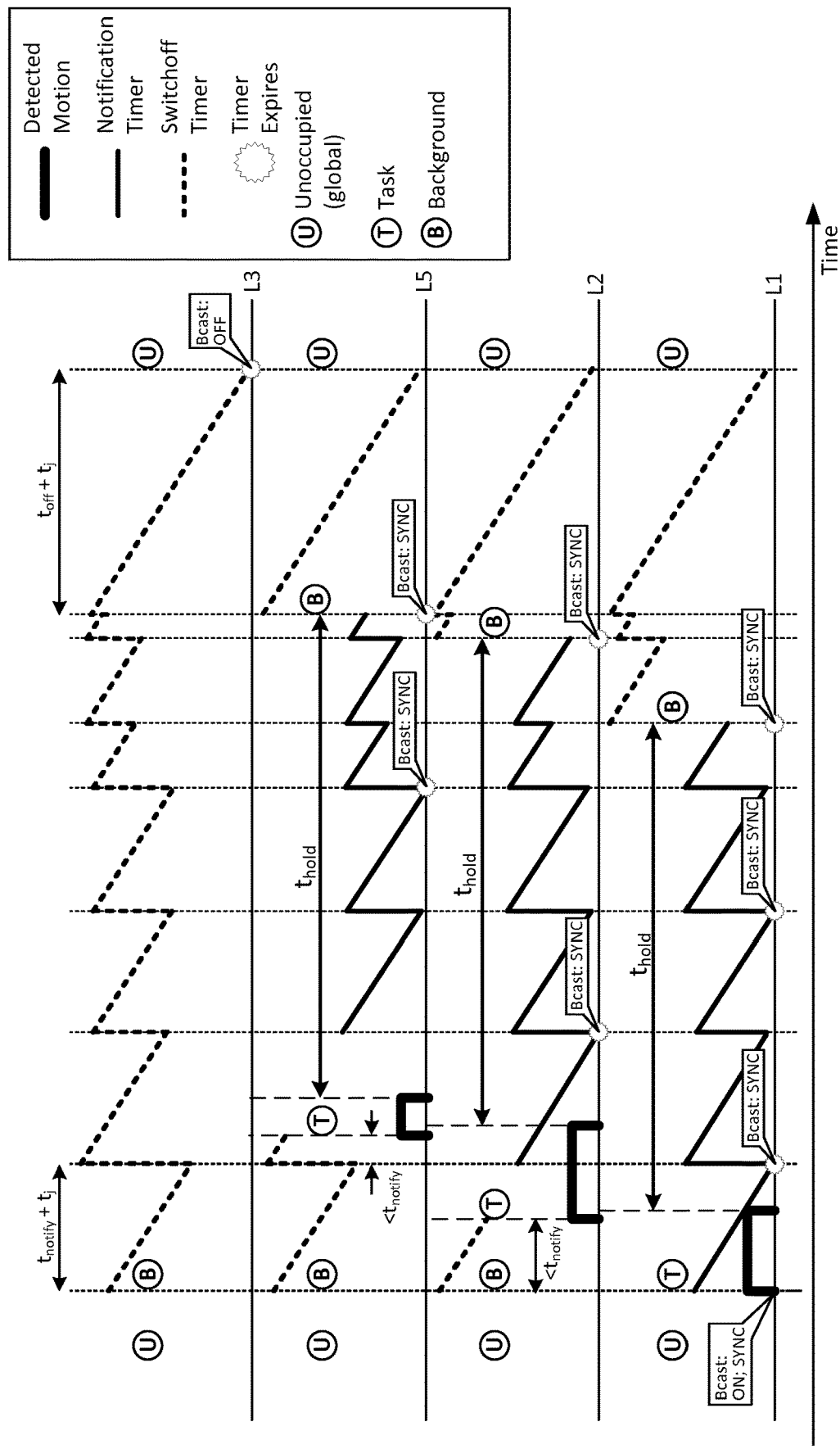
FIGS. 5B and 5C show examples of coordinated behavior of a set of luminaires responding to detected motion.

FIG. 5B shows how luminaires L1, L2, L5 and L3 respond in this situation (with time shown along the x-axis); L4 and L6 are omitted, though it will be appreciated these respond in the same way as L3.

Before the user 504 enters area A1, all of the luminaires are in the Unoccupied state 306 (State U, in FIG. 5B), as none has detected any motion recently. Accordingly, all their illumination sources are switched-off in this example.

Upon the user 504 entering area A1, L1 detects motion locally. Any luminaire detecting motion in State U needs to notify the other luminaires and instruct them to activate, hence in immediate response to the detected motion L1 broadcasts an occupancy notification with a switch-on instruction, causing all of the other luminaires to enter the Background state 304 (State B). L1 also transitions itself to the Task state 302 (State T). Accordingly, all of the luminaires are now actively emitting (all at the same illumination level, or with L1 at a higher level that the rest depending on the implementation).

The result of this is that the Notifier timer at L1 (shown as a solid line), and the Switchoff timers at L2-L6 (shown as a dotted line), are all triggered essentially simultaneously (it is assumed the time it takes to propagate though the network is negligible in context). The Notifier timer at L1 is set to a randomized notification wait time, i.e. $t_{notify}$ adjusted by random jitter $t_j$, and the and the Switchoff timers at L2-L6 are set to randomized switch-off wait times, i.e. $t_{off}$ adjusted by individual random jitters $t_j$, which are more-or-less guaranteed to be different; $t_{off}$ is chosen to be larger than $t_{notify}$ to ensure that the luminaires only switch off when all occupancy notifications have stopped.

The next event to occur is the detection of motion by L2 as the user enters area A2. Because L2 has already received an occupancy notification (from L1) recently, i.e. the time to have elapsed since the last occupancy notification is less than $t_{notify}$, it does not broadcast an occupancy notification at this point, and simply enters State T (which, in turn, may mean that it also increases its illumination level at this point in some implementations).

Shortly after this, L1 stops detecting motion as the user 504 leaves area A1. This sets a hold timer at L1 to start running, set to the hold time $t_{hold}$. The only thing that would prevent L1 from switching to State B when this expires is a detection of motion in area L1.

The next event to occur is the expiry of the Notifier timer at L1. This causes it to broadcast another occupancy notification, thereby resetting the Switchoff timers at L3, L4, L5 and L6 (all in State B) and resetting the Notifier timer at L2 (now in State T also) before they can broadcast an occupancy notification themselves. The Notifier timer is also reset at L1 simultaneously.

Thus, at this point both L1 and L2's Notifier timers start running, set to different randomized values $t_{notify}+t_j$, with a different randomly selected jitter $t_j$ for each. In this example, L2 has the shortest jitter.

Moving forward, as the user 504 enters area A6 and leaves A2, L6 and L2 will respond in the same way: L6 switches to State T upon detecting motion in area A6 but does not broadcast an occupancy notification due to the recent occupancy notification from L1, and the hold time $t_{hold}$ starts running at L2 when the detected motion in A2 ceases.

Likewise, when the user 504 leaves area A6, the hold time $t_{hold}$ starts running at L6 from that time.

The next event to occur is the expirer of the Notifier timer at L2 (as this happens to have the shortest jitter). Therefore, at this point in time, the Notifier timers at L1, L2 and L5 (all now in State T) are reset, and the Switchoff timers are reset at L3, L4 and L6.

No more motion is detected at any of the luminaires after this, so the notification process continues at L1, L2, L5—whichever of those luminaires has their Notifier timers expire first will broadcast an occupancy notification, resetting all of the Notifier timers (to prevent duplicate occupancy notification) and Switchoff timers (to prevent any conflicting switch-off instructions, that would switch-off the luminaires). Because the random jitter is re-computed each time, the occupancy notifications can come from any one of L1, L2 and L5.

Eventually, the hold time $t_{hold}$ elapses at L1. This causes L1 to send out a final occupancy notification, and simultaneously transition to State B (as it has not detected any motion recently). This resets all of the other timers, maintaining synchronization. Likewise, when the hold time $t_{hold}$ elapses at L2 and L5, they also sent out respective occupancy notifications and switch to State B. This last notification ensures that no node will remain in Background for less $t_{off}$ (ignoring the effect of jitter), as is evident from FIG. 5B.

Note, this last notification is optional, and could be removed to reduce broadcast traffic further.

Figure 5C:
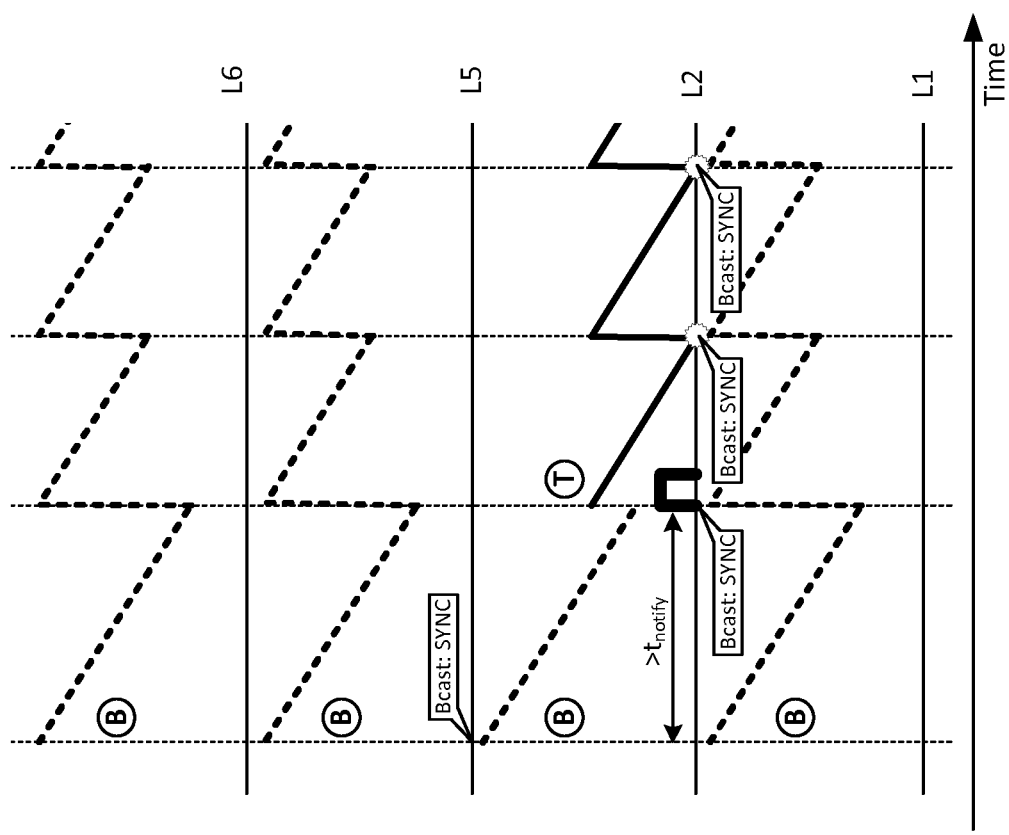
Figure 5D:
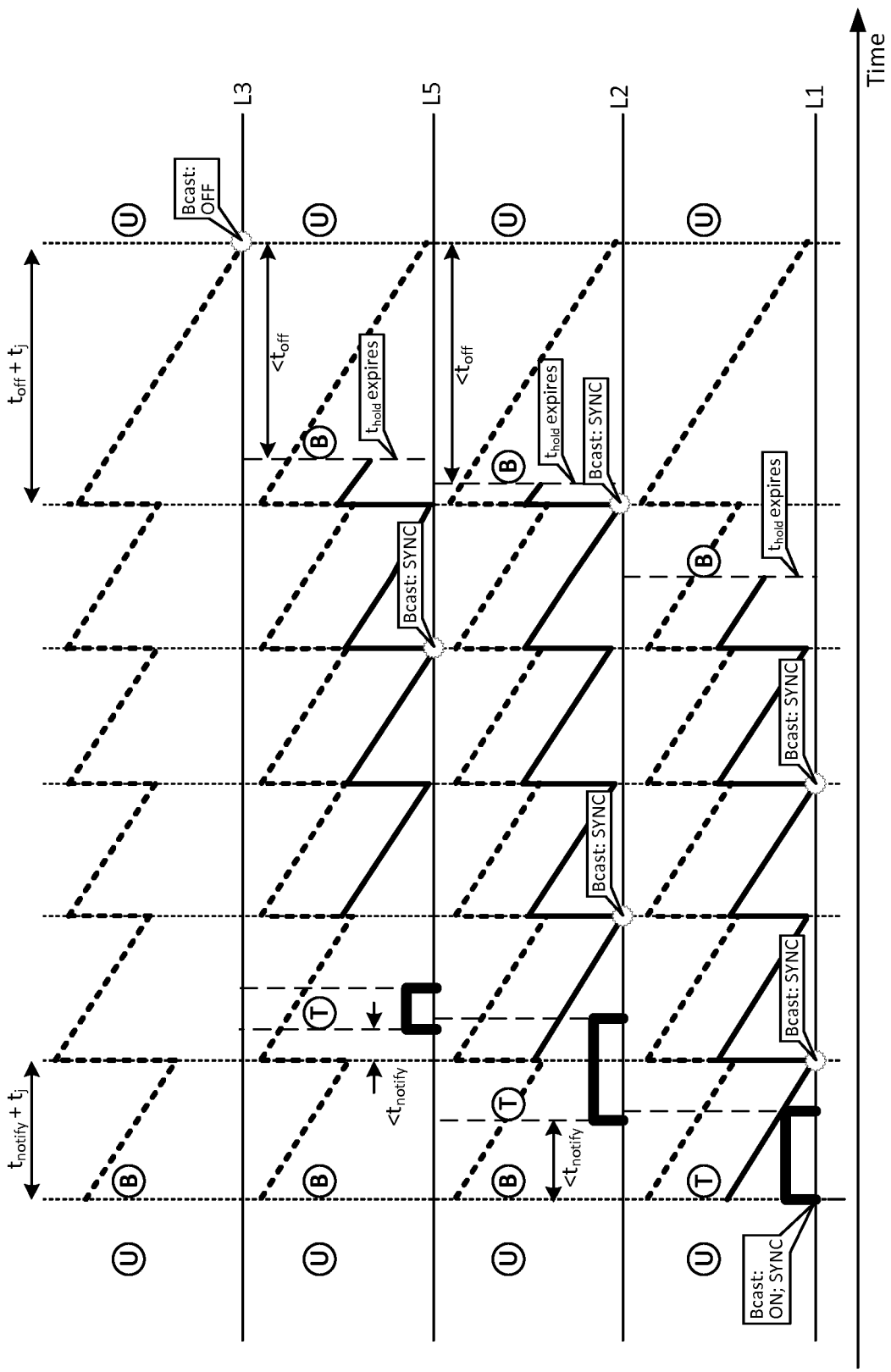
FIG. 5D shows an example of alternative coordinated luminaire behavior.

FIG. 5D illustrates one example of how behavior can be coordinated without this final occupancy notification. In this case, the Switchoff timer runs from each occupancy notification in the Task state; it can only cause a switch-off in the Background state, as in Task, the Notifier timer will always expire first (and in any event, any expiration of the Switchoff timer could be ignored in Task). Expiry of $t_{hold}$ at L1, L2 and L5 is now a localized event: the effect is that the luminaire enters the background state without broadcasting an occupancy notification. Thus its notified timer is rendered inactive (in the above sense), even if it keeps running That is, even if it keeps running, expiry of the inactive notification timer will not be acted upon. The Switchoff timer at each luminaire will continue to be reset for as long as at least one luminaire is in the Task state, but once all luminaires have entered the background state, the Switchoff timer at each luminaire will continue to run from the most recent occupancy notification. In this example, the luminaire whose Switchoff timer expires first (L3) broadcasts a switch-off instruction in response (this is preferred, but optional—see below).

A consequence is that, since the timers in the network are no longer synced upon each transition from Task to Background, a node that has detected occupancy may remain in the Background state for a shorter time than configured, i.e. less than $t_{off}$. This is because the Switchoff timer runs from the last occupancy notification, which may now be earlier than that node's transition from Task to Background. This is the case for L2 and L5 in the example of FIG. 5D. Nevertheless, the behavior is still reasonably predictable, as the minimum time the node will be in the background state is $t_{min} \approx t_{off} - t_{notify}$ (taking jitter into account depending on how the jitter is applied—see above).

Following the L6's transition to State B, all luminaires are synchronized and in State B, with their Switchoff timers running from $t_{off}+t_j$—again with randomized jitters. Now that there are no luminaires in State T, occupancy notification cease.

The first luminaire to have its Switchoff time expire—which happens to be L3—will at that point broadcast a switch-off instruction and enter State U—deactivating their illumination sources 112. In response to the switch-off instruction, all of the other luminaires also enter State U, without broadcasting any switch-off instruction themselves.

The switch-off instruction is also optional: alternatively each node could simply switch off when its own Switchoff timer expires. However, in this case, a synchronization caused by factors such as time drift in their microcontrollers, could result in the luminaires switching off asynchronously. Thus, the broadcasting of a switch-off instruction is preferred to ensure essentially simultaneous switch-off.

For completeness, FIG. 5C considers an alternative example, wherein, after all of the luminaires have switched to the State B, further motion is detected at L2 before the Switchoff timers expire, causing it to switch back to State T. Here, the motion begins at a time after the most recent occupancy notification that exceeds $t_{notify}$—hence L2 transmits an occupancy notification immediately at this point to reset the Switchoff timers at the other luminaires, thus preventing the other luminaires from switching off.

A convenient way of implementing this is to use the Notifier as a global timer, i.e. which is also run and reset in the Background state but only causes occupancy notifications to be broadcast in the Task state (see above): in that case, upon transitioning from Background to Task, a luminaire can check to see if its Notifier timer has expired. If not, then it does not broadcast an occupancy notification at that point, as is the case of L2 and L5 in FIGS. 5B and 5D; however, if it has expired when that transition occurs, the luminaire does broadcast an occupancy notification, as is the case for luminaire L2 in FIG. 5C.

Figure 6A:
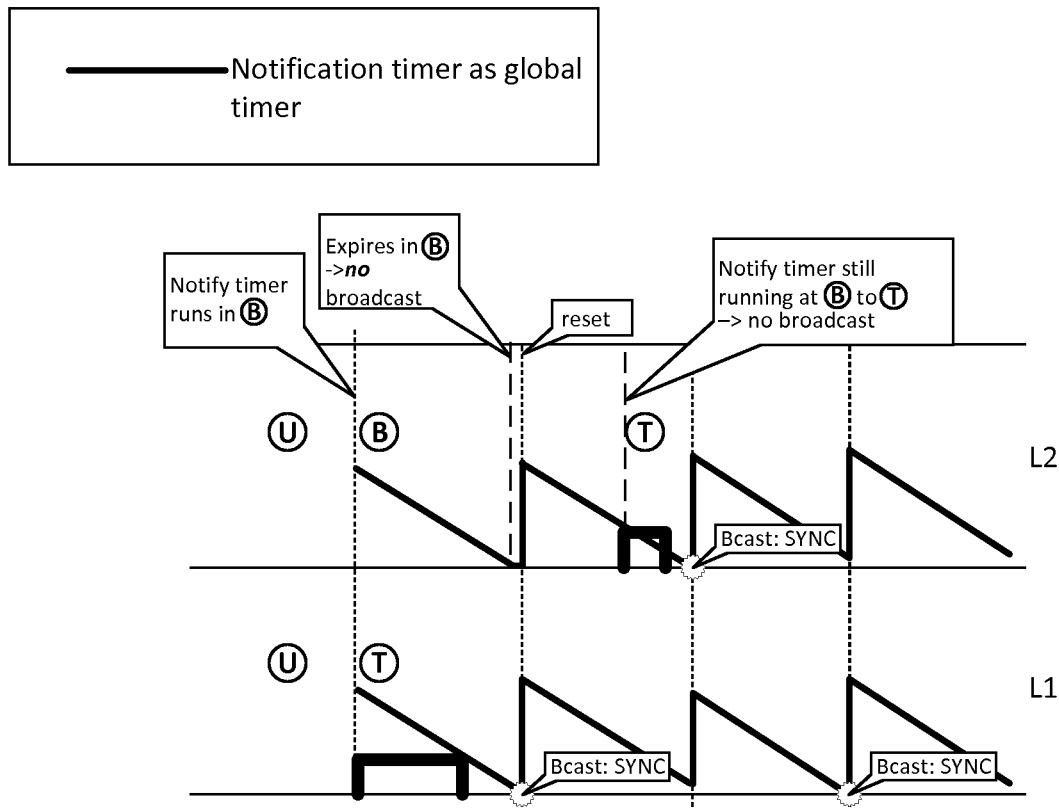
FIGS. 6A and 6B illustrate examples of cooperative behavior based on a global timer.
Figure 6B:
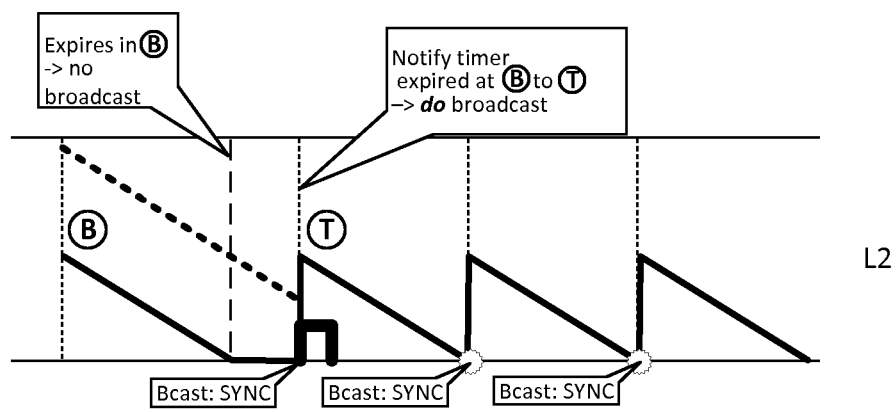

This is illustrated in FIGS. 6A and 6B.

FIG. 6A shows an example where L1 detects motion first, causing L2 to enter Background. L2's notification timer is reset at this point, and runs in Background but is not active at this point. At a later time, whilst L2 is still in Background and L1 is still in Task (thus guaranteeing that L2's notification timer is periodically reset), L2 detects motion, and transition to Task. Because its notification timer is has not expired at this point, it does not broadcast an outgoing occupancy notification.

By contrast, FIG. 6B shows an example similar to FIG. 5C. As in FIG. 5C, all luminaires are initially in Background (though only L2 is shown). L2's notification timer expires in Background and remains expired because all other luminaires are also in Background (hence no occupancy notifications are being broadcast). L2 subsequently detects motion before its switch-off timer expires, and transitions back to Task; because the notification timer has expired by this point, L2 does broadcast an outgoing occupancy notification upon transitioning.

It will be appreciated that the above embodiments have been described by way of example only. Other variations to the disclosed embodiments can be understood and effected by those skilled in the art in practicing the claimed invention, from a study of the drawings, the disclosure, and the appended claims.

As another example, although in the above examples the functionality of the luminaire controller 102 is implemented $$t_{min} = t_{off} - \left(\frac{t_j}{2} + t_{notify}\right) \text{ or } t_{min} = t_{off} - (t_j + t_{notify})$$

in software, alternatively some or all of the functionality in dedicated hardware may alternatively be implemented in dedicated hardware of the luminaire controller 102, such as an application-specific integrated circuit (ASIC), FPGA etc. Thus, in general, the term "component" refers to software, hardware or any combination thereof configured to carry out the functionality in question.

Also, although described in the context of ZigBee, the techniques can be applied to lighting networks operating according to other network protocols.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A luminaire controller for a luminaire comprising:
   a sensor input configured to receive sensor signals from at least one occupancy sensing device of the luminaire;
   a communication interface for communicating with a lighting network;
   a mode selector configured to select one of a set of operating modes for the luminaire based on a combination of the sensor signals and incoming occupancy messages received from the lighting network;
   a local control component configured to control an illumination source of the luminaire according to the selected operating mode; and
   a distributed control component configured to selectively broadcast outgoing occupancy messages via the lighting network when a first of the operating modes is selected by initiating a distributed control procedure when an initiation event occurs, the distributed control procedure, once initiated, being performed as follows:
   if a randomized wait interval elapses relative to a timing of the initiation of the distributed control procedure without an incoming occupancy message being received from the lighting network, responding by broadcasting an outgoing occupancy message via the lighting network; and else
   if an incoming occupancy notification is received before the randomized wait interval elapses relative to the timing of the initiation, responding by re-initiating the distributed control procedure without broadcasting an outgoing occupancy message and using a new randomized wait interval for each such re-initiation of the distributed control procedure.

2. A luminaire controller according to claim 1, wherein the initiation event is:
   the selection of the first operating mode by the mode selector, or
   the receipt of an incoming occupancy message from the lighting network at a time when the first operating mode is selected.

3. A luminaire controller according to claim 1, wherein the set of operating modes comprises:
   a task mode, which the mode selector is configured to select in response to detecting an indication of occupancy in the sensor signals,
   an unoccupied mode,
   a background mode, wherein the mode selector is configured to switch from the unoccupied mode to the background mode in response to an incoming occupancy message.

4. A luminaire controller according to claim 3, wherein the local control component configured to control the illumination source to emit light at a greater intensity when the background or task mode is selected than when the unoccupied mode is selected.

5. A luminaire controller according to claim 4, wherein the local control component configured to control the illumination source to emit light at a greater intensity when the background mode is selected than when the unoccupied mode is selected, and at an even greater intensity when the task mode is selected.

6. A luminaire controller according to claim 3, wherein the mode selector is configured to switch from the task mode to the background mode when no indication of occupancy has been detected in the sensor signals for a hold interval.

7. A luminaire controller according to claim 1, wherein the first operating mode is the task mode, and the distributed control procedure is a notification procedure performed repeatedly whilst the task operating mode remains selected, as follows
   any time a randomized notification wait interval elapses relative to the timing of the initiation of the notification procedure without an incoming occupancy notification being received from the lighting network, responding by broadcasting an outgoing occupancy notification via the lighting network and re-initiating the notification procedure,
   any time an incoming occupancy notification is received before the randomized notification wait interval elapses relative to the timing of the initiation, responding by re-initiating the notification procedure without broadcasting an outgoing occupancy notification,
   wherein the notification procedure is terminated when a switch from the task mode the background mode occurs.

8. A luminaire controller according to claim 7, wherein the notification procedure is initiated in response to the change from the second operating mode to the task mode.

9. A luminaire controller according to claim 8, wherein the distributed control component is also configured to broadcast an initial occupancy message via the lighting network in immediate response to the change from the second operating mode to the task mode, unless a recent incoming occupancy notification has been received at that luminaire when that change occurs.

10. A luminaire controller according to claim 7, wherein the mode selector is configured to switch from the background mode to the unoccupied mode when no occupancy notification has been received for a switch-off wait interval or in response to an incoming switch-off instruction from the lighting network.

11. A luminaire controller according to claim 10, wherein the switch-off wait interval is randomized, wherein the distributed control component is configured to broadcast via the lighting network an outgoing switch-off instruction when the randomized switch-off wait interval elapses, unless an incoming switch-off instruction is received before that interval elapses.

12. A luminaire controller according to claim 1, wherein the distributed control procedure is an instructing procedure performed repeatedly whilst the first operating mode remains selected as follows:
  if a randomized instructing wait interval elapses relative to the timing of the initiation of the instructing procedure without an incoming occupancy notification being received from the lighting network, responding by broadcasting an outgoing instruction via the lighting network, wherein the local control component is configured to adjust an intensity of light emitted by the illumination source in that event;
  any time an incoming occupancy notification is received before the randomized instructing wait interval elapses relative to the timing of the initiation, responding by re-initiating the instructing procedure without broadcasting an outgoing instruction, wherein the local control component does not adjust the light intensity in that event,
  whereby the intensity is adjusted only when incoming occupancy notifications have ceased.

13. A luminaire controller according to claim 12, wherein if the randomized instructing wait interval elapses relative to the timing of the initiation of the instructing procedure without an incoming occupancy notification being received from the lighting network, the mode selector responds by switching to a different one of the operating modes and the instructing procedure is terminated.

14. A method of controlling a plurality of luminaires in a lighting network, the method comprising implementing, at each of the luminaires, the following steps:
  receiving sensor signals from at least one occupancy sensing device of the luminaire;
  selecting one of a set of operating modes for the luminaire based on a combination of the sensor signals and incoming occupancy messages received at the luminaire from the lighting network;
  controlling an illumination source of the luminaire according to the selected operating mode; and
  selectively broadcast outgoing occupancy messages via the lighting network when a first of the operating modes is selected by initiating a distributed control procedure when an initiation event occurs, the distributed control procedure, once initiated, being performed as follows:
  if a randomized wait interval elapses relative to a timing of the initiation of the distributed control procedure without an incoming occupancy message being received from the lighting network, responding by broadcasting an outgoing occupancy message via the lighting network; and else
  if an incoming occupancy notification is received before the randomized wait interval elapses relative to the timing of the initiation, responding by re-initiating the distributed control procedure without broadcasting an outgoing occupancy message and using a new randomized wait interval for each such re-initiation of the distributed control procedure.

15. A non-transitory computer-readable medium comprising computer program code that is configured, when executed by one or more processors at a luminaire, the luminaire being a part of a plurality of luminaires in a lighting network, to implement the steps of:
  receiving sensor signals from at least one occupancy sensing device of the luminaire;
  selecting one of a set of operating modes for the luminaire based on a combination of the sensor signals and incoming occupancy messages received at the luminaire from the lighting network;
  controlling an illumination source of the luminaire according to the selected operating mode; and
  selectively broadcast outgoing occupancy messages via the lighting network when a first of the operating modes is selected by initiating a distributed control procedure when an initiation event occurs, the distributed control procedure, once initiated, being performed as follows:
  if a randomized wait interval elapses relative to a timing of the initiation of the distributed control procedure without an incoming occupancy message being received from the lighting network, responding by broadcasting an outgoing occupancy message via the lighting network; and else
  if an incoming occupancy notification is received before the randomized wait interval elapses relative to the timing of the initiation, responding by re-initiating the distributed control procedure without broadcasting an outgoing occupancy message and using a new randomized wait interval for each such re-initiation of the distributed control procedure.

* * * * *